US008360360B2

(12) United States Patent
Cros et al.

(10) Patent No.: US 8,360,360 B2
(45) Date of Patent: Jan. 29, 2013

(54) MOTORIZED UNDERCARRIAGE FOR AIRCRAFT

(75) Inventors: Christophe Cros, L'Union (FR); Debbie Leusink, Eguilles (FR)

(73) Assignees: Airbus, Blagnac (FR); Airbus Operations, Toulouse (FR)

( * ) Notice: Subject to any disclaimer, the term of this patent is extended or adjusted under 35 U.S.C. 154(b) by 692 days.

(21) Appl. No.: 12/637,472

(22) Filed: Dec. 14, 2009

(65) Prior Publication Data

US 2010/0206980 A1 Aug. 19, 2010

(30) Foreign Application Priority Data

Dec. 16, 2008 (FR) ...................................... 08 58645

(51) Int. Cl.
*B64C 25/02* (2006.01)

(52) U.S. Cl. .................. 244/103 R; 244/50; 244/100 R

(58) Field of Classification Search .................... 244/50, 244/51, 103 S, 103 R, 100 R
See application file for complete search history.

(56) References Cited

U.S. PATENT DOCUMENTS

| 2,418,123 | A | * | 4/1947 | Joy ............................. 244/103 S |
| 2,425,583 | A | * | 8/1947 | Volk ............................ 244/103 S |
| 2,500,577 | A | * | 3/1950 | Sands, Jr. .................... 244/103 R |
| 2,506,146 | A | * | 5/1950 | Gladish ........................ 310/67 R |
| 3,059,712 | A | * | 10/1962 | Hautau ............................ 244/58 |
| 3,482,806 | A | * | 12/1969 | Trautzsch et al. ......... 244/103 R |
| 3,711,043 | A | * | 1/1973 | Cameron-Johnson .......... 244/50 |
| 3,977,631 | A | * | 8/1976 | Jenny .............................. 244/50 |
| 4,659,039 | A | * | 4/1987 | Valdes ........................ 244/103 S |
| 4,930,590 | A | | 6/1990 | Love et al. |
| 5,633,544 | A | * | 5/1997 | Toida et al. ................. 310/67 R |
| 6,450,448 | B1 | * | 9/2002 | Suzuki ....................... 244/103 R |
| 6,615,958 | B1 | * | 9/2003 | Baden ..................... 188/264 AA |
| 7,445,178 | B2 | * | 11/2008 | McCoskey et al. ............. 244/50 |
| 7,469,858 | B2 | * | 12/2008 | Edelson ..................... 244/103 S |
| 7,528,518 | B2 | * | 5/2009 | Maeda et al. ............... 310/67 R |
| 8,109,463 | B2 | * | 2/2012 | Cox et al. ......................... 244/50 |
| 2007/0158497 | A1 | * | 7/2007 | Edelson et al. ............ 244/103 S |
| 2010/0276535 | A1 | * | 11/2010 | Charuel et al. ................ 244/50 |
| 2010/0288873 | A1 | * | 11/2010 | Cox et al. ......................... 244/50 |
| 2012/0001018 | A1 | * | 1/2012 | Gilleran et al. ................ 244/50 |
| 2012/0104158 | A1 | * | 5/2012 | Charles et al. ................. 244/50 |
| 2012/0104159 | A1 | * | 5/2012 | Charles et al. ................. 244/50 |

FOREIGN PATENT DOCUMENTS

| FR | 2.065.734 | 8/1971 |
| FR | 2 695 083 A1 | 3/1994 |
| GB | 2 270 055 A | 3/1994 |

OTHER PUBLICATIONS

French Preliminary Search Report issued in French Patent Application No. 0858645 on Jul. 17, 2009 (w/ translation).

* cited by examiner

*Primary Examiner* — Michael Carone
*Assistant Examiner* — Steven Hawk
(74) *Attorney, Agent, or Firm* — Oliff & Berridge, PLC

(57) ABSTRACT

The undercarriage for aircraft comprises:
  at least one wheel provided with a rim;
  a hub carrying the rim; and
  a motor and gearing for driving the wheel, the motor and the gearing being received, preferably completely, inside the hub.

11 Claims, 2 Drawing Sheets

MOTORIZED UNDERCARRIAGE FOR AIRCRAFT

The present invention relates to aircraft undercarriages.

BACKGROUND OF THE INVENTION

Document FR-2 065 734 discloses, in the embodiment of its FIG. 2, an aircraft undercarriage that includes a motor and gearing, both positioned to extend a hub of an undercarriage wheel, on the axis thereof. The motor serves to drive the wheel for self-propelled taxiing of the airplane on the ground without it being necessary to call on a tractor.

The gearing extends facing the rim of the wheel and beyond it in the axial direction. Unfortunately, that arrangement presents drawbacks. The gearing extending outside the volume of the undercarriage increases the overall size of the undercarriage. It is therefore necessary to provide a particularly large volume in the well in the airplane fuselage for receiving the undercarriage. However that reduces the performance of the aircraft and its capacity in terms of payload or passenger transport.

In addition, the gearing and the motor positioned in that way constitutes obstacles to dismantling the wheel or the brake, when that is necessary. Under such conditions, it is necessary to begin by dismantling the gearing and the motor in order to gain access to the wheel or the brake. Operations involving repairing or replacing the wheel or the brake are therefore lengthy and expensive.

Finally, when it is desired to cool the brake from the rim, the volume occupied by the gearbox once more constitutes an obstacle.

OBJECT AND SUMMARY OF THE INVENTION

An object of the invention is thus to mitigate those drawbacks.

To this end, the invention provides an aircraft undercarriage that comprises:
 at least one wheel provided with a rim;
 a hub carrying the rim; and
 a motor and gearing for driving the wheel, the motor and the gearing being received, preferably completely, inside the hub.

Thus, the total width and the track width of the undercarriage are limited. This dimension is important for dimensioning the undercarriage well and more generally the zone of the aircraft referred to as the underbelly. Aircraft performance is thus improved. Furthermore, it is particularly easy to access the wheel and the brake in order to repair them or to replace them. Finally, it is possible to cool the brake from the rim, insofar as the gearing does not present any obstacle.

Preferably, at least one of the motor and the gearing is interposed in a radial direction relative to the axis of the hub between the axis and a brake of the wheel. Also preferably, at least one of the motor and the gearing is interposed in a radial direction relative to the axis of the hub, between the axis and a tire of the wheel.

Each of these characteristics enables the total width of each wheel to be reduced and thus once more enables the track width of the undercarriage to be reduced, thereby further reducing the dimensions of the undercarriage well in the fuselage.

Advantageously, the motor is of the hydraulic type, preferably of the so-called fast or axial type, the motor including, for example, a piston for varying a cylinder capacity of the motor.

Such a motor is particularly well adapted to the invention since it may present an overall diameter that is small.

Advantageously, the motor is of electric type.

Advantageously, the undercarriage includes motor power supply means, said means extending through a member for preventing the hub from turning relative to a leg of the undercarriage.

Preferably, an outlet member of the gearing is fastened to the rim by means of at least one element that is arranged to break under the effect of stress presenting a magnitude that exceeds a predetermined threshold.

Thus, in the event of the motor becoming blocked or failing, the motor is disconnected from the rim so that the airplane can continue to be operated normally for taxiing. It remains possible under such conditions to tow the airplane in conventional manner. Such an arrangement also counters the consequences of untimely operation of the motor or of the motor becoming blocked, particularly when running at high speed during takeoff or landing.

Preferably, the undercarriage comprises a coupling member enabling the undercarriage to be placed at will in a coupled configuration in which the motor engages with the rim, and an uncoupled configuration in which the motor does not engage with the rim.

This decoupling also enables any rotary connection between the motor and the rim to be eliminated at will, and thus makes it possible to counter the consequences of the motor operating abnormally.

Advantageously, the coupling member includes a member with hydraulic type control.

This simplifies control of the member. For example, provision can be made for the absence of hydraulic pressure in the coupling member to cause it to decouple.

The invention also provides an airplane that includes at least one undercarriage of the invention.

BRIEF DESCRIPTION OF THE DRAWINGS

Other characteristics and advantages of the invention appear further from the following description of a preferred embodiment given by way of non-limiting example and with reference to the accompanying drawings, in which.

MORE DETAILED DESCRIPTION

Figure 1:
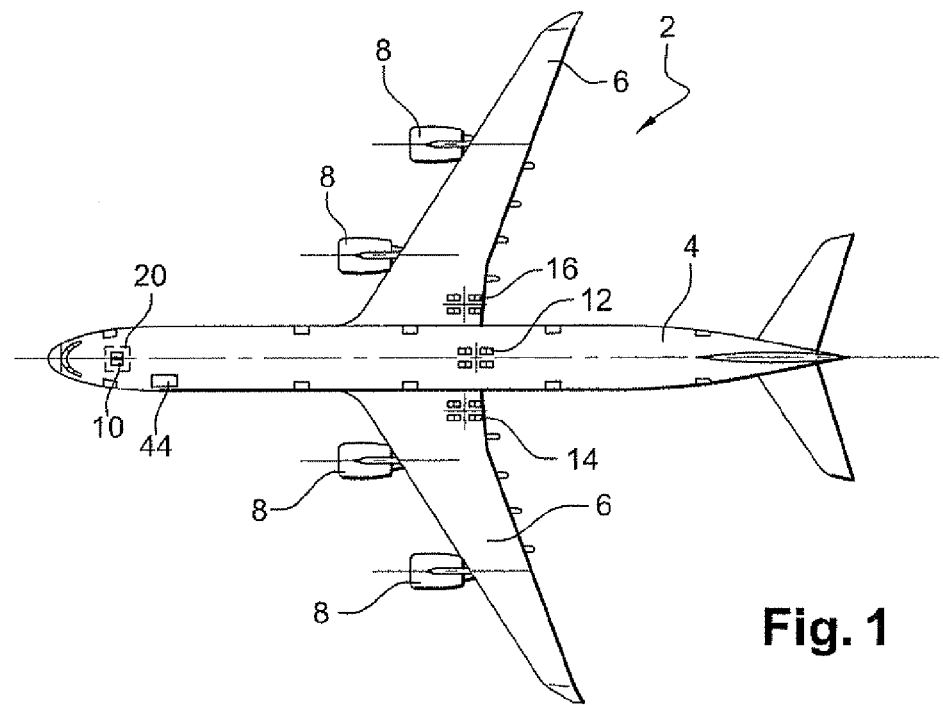
FIG. 1 is a plan view of an aircraft constituting an embodiment of the invention.

With reference to FIGS. 1 to 4, there follows a description of an aircraft including an undercarriage of the invention. In the present example, the aircraft 2 is an airplane suitable for landing and taking off by running along a runway. Nevertheless, the invention is not limited to this type of aircraft and it may be applied to vertical takeoff and landing aircraft.

The aircraft 2 specifically comprises a fuselage 4, two wings 6, and four engines 8 organized as two pairs carried by the respective wings. The airplane 2 has a nose undercarriage 10 comprising twin wheels, and also three main undercarriages, namely one undercarriage 12 situated under the fuselage and two undercarriages 14 and 16 situated under respective ones of the wings.

There follows a description in greater detail of the nose undercarriage 10.

The undercarriage 10 comprises an undercarriage leg 18 and a shock absorber 19 connecting the leg to the fuselage 4. The fuselage has a wheel well 20 suitable for receiving the undercarriage 10 in a folded position while the aircraft is in flight. In its deployed position, while running on the ground, the undercarriage occupies the position shown in FIG. 3, the leg 18 and the shock absorber 19 having a common vertical axis 22.

The undercarriage includes a hub 24 presenting symmetry of revolution about its main horizontal axis 26. The hub is received in particular in an annular orifice 28 of the leg 18. The hub is rigidly fastened to the leg 18 by means of fastener elements 30 such as the elements visible in the section plane of FIG. 3. Specifically, it comprises a screw having a thread that co-operates with the tapping of an orifice formed in the leg, and with an orifice formed in the hub, these two orifices extending radially relative to the axis 26.

Specifically, the hub 24 has an inside face 32 of cylindrical shape about the axis 26, and of circular cross-section. This face defines a housing 34 inside the hub for receiving a geared motor assembly 36 comprising firstly a motor 38 and secondly a gearing or reduction gear 39 enabling the outlet part 40 of the gearing to deliver a speed of rotation about the axis 26 that is different from the speed of rotation of an outlet shaft of the motor 38. Specifically, the motor 38 is completely received inside the housing 34. A major fraction of the gearing 39 is received inside the housing 34. The only portion of the gearing that is not contained in the housing is a distal fraction of its outlet part 40.

Specifically, the motor 38 is a hydraulic motor. In the present example, it is constituted by a hydraulic motor of the fast or axial type. The principles of such a motor are known to the person skilled in the art. The variation in cylinder capacity needed to enable the motor to be used over a sufficiently wide range of speeds of rotation is obtained by axially sliding the swash-plate of the motor in the form of a piston 42. This type of motor is particularly well adapted to the invention since, with its gearing, it is capable of presenting a diameter that is small enough to be incorporated inside the hub 24. (By way of example, a Single Aisle type wheel presents a hub having a diameter of ten centimeters.) It is possible to design such a motor without difficulty to comply with major constraints in terms of outside diameter. It is suitable for operating at high speeds, e.g. several thousands of revolutions per minute. That is why the gearing 39 is provided so as to reduce its outlet speed to that required by the wheels of the undercarriage 10 that are required to operate at only a few hundreds of revolutions per minute.

The airplane 2 includes a pump 44, e.g. housed in the fuselage, at a distance from the undercarriage and the wheel bay 20. The pump 44 delivers fluid under pressure to the motor 38. The pump 44 is connected by two pipes 46 to fluid inlet and outlet orifices 47 and 48 of the motor. In the present example, the pipes 46 pass through one or more of the fastener members 30, passing along the insides thereof on the fastener and thus extending radially relative to the axis 26 at this point. For this purpose, the member 30 is hollow and overdimensioned in terms of diameter. The pipes 46 are designed to be flexible so as to avoid impeding the movements of the undercarriage while it is being retracted into and extended from the well 20. One pipe 46 could be housed in one member 30 and the other pipe could be housed in another member 30 distinct from the first. It can be seen that the geared motor is powered by fluid passing into the hub after passing along the leg 18.

Instead of a hydraulic motor, it would be possible to use an electric motor. Specifically, the power developed by an electric motor may be adapted by appropriately selecting the diameter or the length of the motor. It is thus possible to envisage selecting these two parameters and thereby selecting a motor suitable for being inserted in the hub 24. Since the torque delivered by the motor is proportional to its diameter, such a motor might not be capable on its own of delivering the high torque needed for taxiing the airplane. Provision can then be made for the engine to rotate at a speed that is sufficiently high, and for it to be used in association with gearing 39 for adapting the speed and the torque of the motor to the required levels. With an electric motor, the hydraulic pump is replaced by an electrical power unit that feeds electricity to the motor through the members 30 by means of cables that replace the pipes 46.

The geared motor assembly 36, and in particular the motor 38, is rigidly secured to the hub 24, in particular by means of longitudinal fluting 50 parallel to the axis 26 that is formed in its outside face 31 and that cooperates by being complementary in shape to fluting 49 formed in the inside face 32 of the hub, consequently preventing any rotation of the motor or the gearing relative to the hub 24 about the axis 26.

The undercarriage includes a brake 52 comprising a rotor 54 and a stator 56. The rotor 54 is rigidly fastened to one of the wheels 63 of the undercarriage while the stator 56 is rigidly fastened to the hub 24. In the brake likewise, the fastening is performed by cooperation between complementary shapes of longitudinal fluting 58 parallel to the axis 26 formed in the peripheral inside faces of the stator elements 56 and also similar fluting 60 formed in the outside face 62 of the hub 24.

One of the wheels 63 of the undercarriage 10 has a rim 64 comprising a disk 66 of generally plane shape extending in a plane perpendicular to the axis 26. The rim 64 is mounted to move in rotation relative to the hub 24 about the axis 26. For this purpose it is installed on two rotary bearings 70 having rollers 72 arranged in two respective sets of rollers with axes that are inclined in opposite directions relative to the axis 26. The axes of the rollers thus present a roof-shaped arrangement when seen in the half-view in axial section of FIG. 2. The rim 64 has a central portion 74 formed integrally with the disk 66 and rigidly connected by one or more fastener elements 76 to the outlet part 40 of the gearing 39. Fastening is provided in this example by a screw 76.

The gearing 39 is of the epicyclic type, for example. It serves to deliver torque and speed of rotation that are modified relative to the values thereof at the outlet from the motor, as a function of the requirements of the undercarriage.

Figure 2:
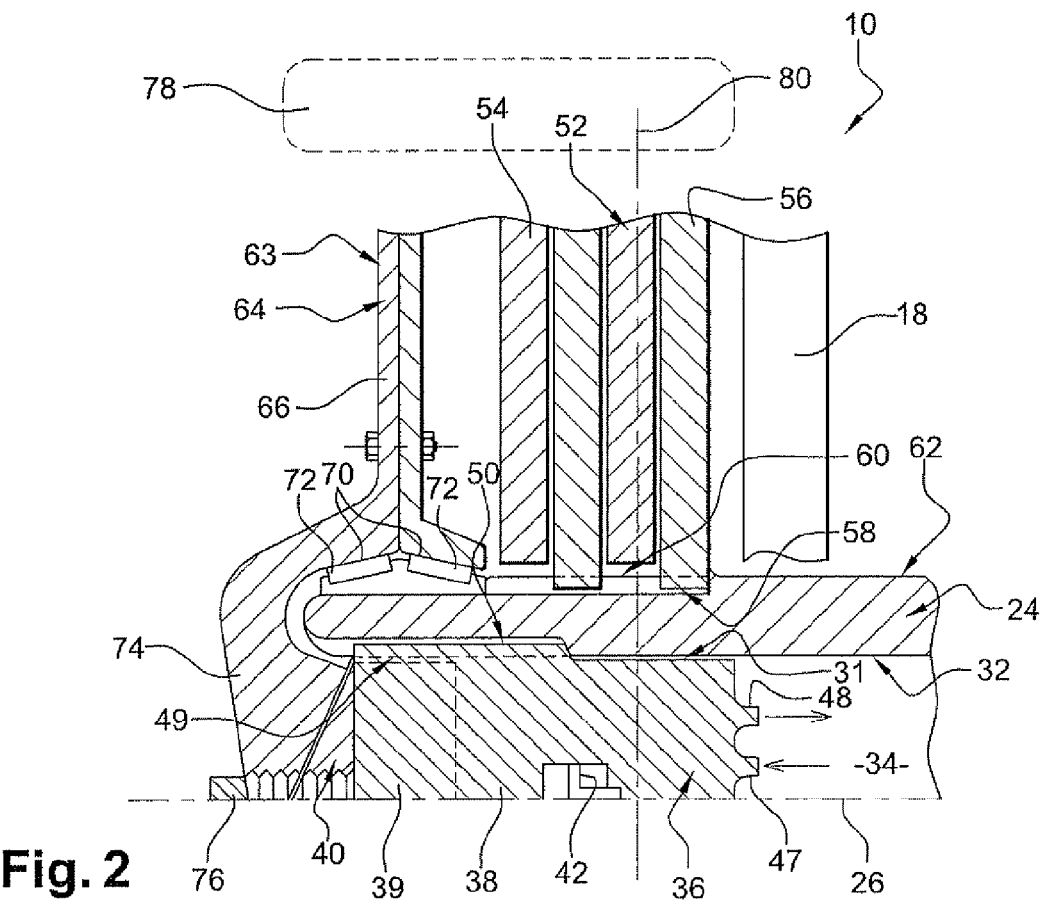
FIG. 2 is a fragmentary axial half-section of the nose undercarriage of the FIG. 1 aircraft.
Figure 3:
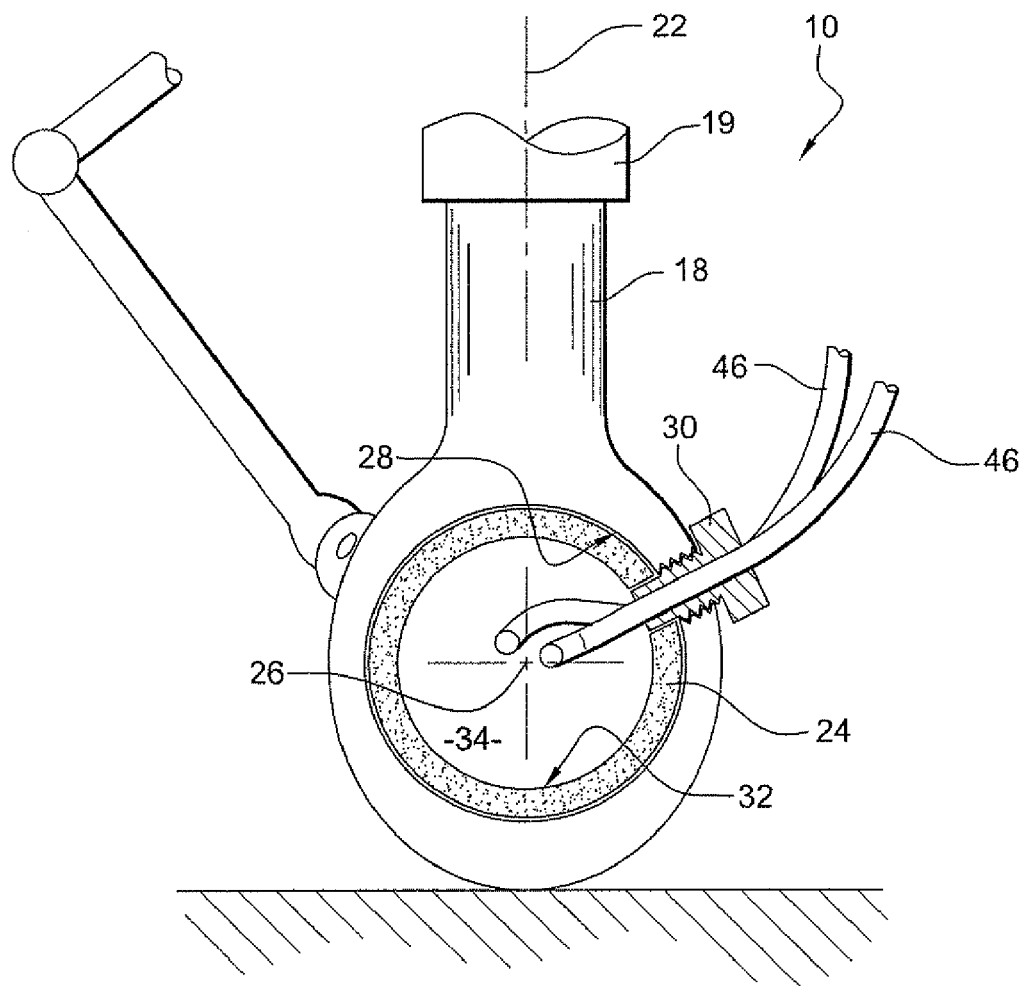
FIG. 3 is a view of the FIG. 2 undercarriage in section on a plane perpendicular to its axis and passing through its hub.
Figure 4:
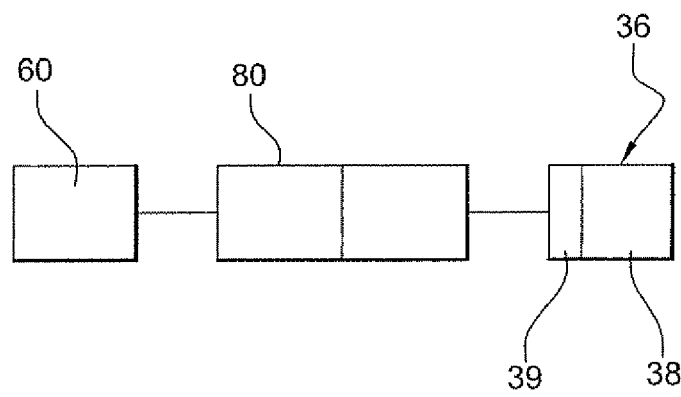
FIG. 4 is a diagram showing the coupling member of the undercarriage of FIGS. 2 and 3.

The rim 64 carries a tire 78 of the wheel, shown diagrammatically in FIG. 2. In the present example, the tire 78 extends radially outside the disk 66 and the brake 56. The hub 24 and the brake 56 are both interposed between the motor 38 and the tire 78 in the present example. In other words, there exists at least one straight line 80, marked in FIG. 2, that extends radially relative to the axis 26 and that intercepts simultaneously the motor 38, the hub 24, the brake 56, and the tire 78, these elements following one another in that order in the radial direction going away from the axis 26.

A transmission or drive system 36 is thus installed in the relatively small volume inside the hub. The invention does not modify in any way the procedures for installing and fastening the wheel 63 and the braking system to the hub. It may suffice merely to provide an additional connection between the rim and the motor. There is thus no need to provide for special training or specific tools for use by personnel acting on airplane wheels.

Insofar as the length of the hub 24 is generally relatively long, it is possible to give the motor 38 a relatively small diameter for given cylinder capacity. The impact of the invention on the dimensioning of the undercarriage and thus on the performance of the aircraft is therefore limited compared with a non-motorized undercarriage.

Consequently, provision can be made for providing the motorization of the invention as an option. For the airplane manufacturer, the parts other than those relating to the motorization are common with non-motorized undercarriages. If the airline purchasing the aircraft from the manufacturer does not select this option, it is not penalized in any significant manner in terms of performance by the arrangements provided to make this option possible.

Should the motor 38 become blocked or suffer a failure, it suffices to disconnect the rim 66 from the part 40 by means of the member 76 in order to allow the wheel to turn freely so that the airplane can be operated like an airplane that does not have a motorized undercarriage. Thus, failure of such a motor does not have an impact on safety.

In a variant, it may be envisaged that the fastener element 76 is arranged to break under the effect of stress, here shear stress, of a magnitude that exceeds a predetermined threshold. The element 76 then acts as a fuse and breaks in the event of excess torque associated with untimely operation of the motor or with the motor becoming blocked, particularly when running at high speed (takeoff and landing).

In another variant, this type of incident is avoided in a different manner. Thus, with reference to FIG. 4, a clutch 80 is provided that enables the undercarriage to be placed at will in a clutched configuration in which the motor 38 is mechanically engaged with the rim 66, and a declutched configuration in which the motor is not engaged with the rim, so the rim is free to turn independently of the motor. By way of example, provision can be made for the clutch to be controlled hydraulically. It is thus possible to envisage that the rim is in mechanical engagement with the motor only in the event of the motor being supplied with hydraulic pressure. A return spring may be provided so that if the motor is OFF, i.e. is not subjected to pressure, then the clutch is automatically declutched, thereby eliminating any physical connection between the motor and the wheel. It is also possible to replace the clutch by a jaw clutch. That is to say the term "jaw" clutch indicates that the parts that are to rotate together are secured to each other by mutual engagement of the parts, whereas otherwise a clutch connects the parts together by friction. The parts in question comprise the central portion 74 and the outlet part 40.

The invention does not complicate the time required for an operator to act to change a wheel or a brake or to repair them, where such operations are relatively commonplace on an airplane. In particular, it is possible to dismantle the wheel without dismantling the drive or transmission system 36. Because the wheels are driven by the motor via the outside portion of the wheel, there is no interference with the brake 52.

In the prior art, it is known that the face inside the hub is sometimes used for auxiliary functions such as a speed-measuring tachometer. These functions can easily be performed by other means disposed at some other location on the airplane.

Furthermore, it is known that the main engines 8 of aircraft are generally too powerful when idling during taxiing, thereby requiring the pilot of the aircraft to use the brakes 52 to perform braking on a continuous basis, thereby requiring the brakes to be dimensioned accordingly. Here, by using the motorization 36, it is possible to save on wear of the brakes 52, thereby making it possible to envisage significantly reducing the size of the braking device. It is also possible to use the motorization 36 while the airplane 2 is decelerating after landing, with the geared motor then producing a motor braking effect, contributing to braking.

It is possible to envisage increasing the inside diameter of the brakes a little so as to allow the motorization 36 to be housed in the hub 24 without that significantly increasing the width of the brakes (e.g. by acting on the thickness of the disk or the number of the disks). The invention once more presents very little impact on the overall shape of the wheel and the undercarriage.

Naturally, numerous modifications could be made to the invention without going beyond its ambit.

The motorized hub may be the hub for a single wheel of the undercarriage, e.g. when the undercarriage has only one wheel, or it may be a hub that is common to a plurality of wheels of the undercarriage.

Provision could be made for one or more of the main undercarriages to be motorized instead of the nose undercarriage, or indeed to provide for the nose undercarriage and at least one of the main undercarriages to be motorized.

Provision could be made for the gearing and the motor both to be received completely within the hub.

What is claimed is:

1. An undercarriage for an aircraft, wherein the undercarriage comprises:
    at least one wheel provided with a rim;
    a hub carrying the rim; and
    a motor and gearing for driving the wheel, the motor and the gearing being received inside the hub,
    wherein at least one of the motor and the gearing is interposed fully below a top portion of the hub and in a radial direction relative to the axis of the hub between the axis and a brake of the wheel.

2. An undercarriage according to claim 1, wherein at least one of the motor and the gearing is interposed in a radial direction relative to the axis of the hub, between the axis and a tire of the wheel.

3. An undercarriage according to claim 1, wherein the motor is an electric motor.

4. An undercarriage according to claim 1, including motor power supply means, said means extending through a member for preventing the hub from moving relative to a leg of the undercarriage.

5. An undercarriage according to claim 1, including a coupling member enabling the undercarriage to be placed at will in a coupled configuration in which the motor engages with the rim, and an uncoupled configuration in which the motor does not engage with the rim.

6. An undercarriage according to claim 5, wherein the coupling member includes a hydraulic control member.

7. An aircraft, including at least one undercarriage according to claim 1.

8. An undercarriage according to claim 1, wherein the motor and the gearing are received completely inside the hub.

9. An undercarriage according to claim 1, wherein the motor is a hydraulic motor, the motor including a piston for varying a cylinder capacity of the motor.

10. An undercarriage according to claim 9, wherein the hydraulic motor is a fast or axial motor.

11. An undercarriage according to claim 1, wherein an outlet member of the gearing is fastened to the rim by means of at least one element that is arranged to break under the effect of stress presenting a magnitude that exceeds a predetermined threshold.

* * * * *